(12) United States Patent
Annapragada et al.

(10) Patent No.: US 10,890,361 B2
(45) Date of Patent: Jan. 12, 2021

(54) ELECTROCALORIC HEAT TRANSFER SYSTEM

(71) Applicant: CARRIER CORPORATION, Jupiter, FL (US)

(72) Inventors: Subramanyaravi Annapragada, South Windsor, CT (US); Thomas D. Radcliff, Vernon, CT (US); Parmesh Verma, South Windsor, CT (US); Neal R. Herring, East Hampton, CT (US); David E. Parekh, Farmington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 524 days.

(21) Appl. No.: 15/617,771

(22) Filed: Jun. 8, 2017

(65) Prior Publication Data
US 2017/0356679 A1    Dec. 14, 2017

Related U.S. Application Data

(60) Provisional application No. 62/347,589, filed on Jun. 8, 2016.

(51) Int. Cl.
F25B 21/00    (2006.01)

(52) U.S. Cl.
CPC ........ *F25B 21/00* (2013.01); *F25B 2321/001* (2013.01); *Y02B 30/00* (2013.01)

(58) Field of Classification Search
CPC ................... F25B 21/00; F25B 2321/00; F25B 2321/002; F25B 2321/0021–2321/0023; F25B 2321/001; Y02B 30/66; Y02B 30/72; F24F 2203/1032
See application file for complete search history.

(56) References Cited

U.S. PATENT DOCUMENTS

| | | |
|---|---|---|
| 5,699,668 A | 12/1997 | Cox |
| 6,328,095 B1 | 12/2001 | Felber et al. |

(Continued)

FOREIGN PATENT DOCUMENTS

| | | | |
|---|---|---|---|
| GB | 2420662 | * | 5/2006 |
| JP | 2013160460 A | | 8/2013 |

(Continued)

*Primary Examiner* — Frantz F Jules
*Assistant Examiner* — Webeshet Mengesha
(74) *Attorney, Agent, or Firm* — Cantor Colburn LLP (57) ABSTRACT

A heat transfer system cycles between a first mode where a heat transfer fluid is directed to a first electrocaloric module and from the first electrocaloric module to a heat exchanger to a second electrocaloric module while one of the first and second electrocaloric modules is energized, and a second mode where the heat transfer fluid is directed to the second electrocaloric module and from the second electrocaloric module to the heat exchanger to the first electrocaloric module, while the other of the first and second electrocaloric modules is energized. The modes are repeatedly cycled in alternating order directing the heat transfer fluid to cause a temperature gradient in each of the first and second electrocaloric modules, and fluid from a flow path between the electrocaloric modules is mixed with circulating fluid from a conditioned space to cool or heat the conditioned space.

17 Claims, 7 Drawing Sheets

(56) References Cited

U.S. PATENT DOCUMENTS

| | | | |
|---|---|---|---|
| 6,442,951 B1* | 9/2002 | Maeda | F24F 3/1423 62/271 |
| 6,595,004 B1* | 7/2003 | Ghoshal | F25B 21/00 62/3.1 |
| 7,090,000 B2 | 8/2006 | Taylor | |
| 8,069,674 B2 | 12/2011 | Bell | |
| 8,651,171 B2 | 2/2014 | Yang | |
| 9,109,818 B2 | 8/2015 | Schwartz et al. | |
| 2003/0102106 A1 | 6/2003 | Moilala | |
| 2010/0115977 A1 | 5/2010 | Saroka | |
| 2010/0147004 A1 | 6/2010 | Yang | |
| 2012/0267090 A1 | 10/2012 | Kruglick | |
| 2014/0020405 A1 | 1/2014 | Kruglick | |
| 2014/0345296 A1* | 11/2014 | Defay | F25B 21/00 62/3.1 |
| 2017/0268805 A1* | 9/2017 | Radcliff | F25B 21/00 |

FOREIGN PATENT DOCUMENTS

| | | |
|---|---|---|
| WO | 02055939 A1 | 7/2002 |
| WO | 2006056809 A1 | 6/2006 |
| WO | 2015163839 A1 | 10/2015 |

\* cited by examiner

ELECTROCALORIC HEAT TRANSFER SYSTEM

CROSS-REFERENCE TO RELATED APPLICATION

This patent application claims priority to U.S. Provisional Patent Application Ser. No. 62/347,589, filed Jun. 8, 2016, which is incorporated herein by reference in its entirety.

BACKGROUND

A wide variety of technologies exist for cooling applications, including but not limited to evaporative cooling, convective cooling, or solid state cooling such as electrothermic cooling. One of the most prevalent technologies in use for residential and commercial refrigeration and air conditioning is the vapor compression refrigerant heat transfer loop. These loops typically circulate a refrigerant having appropriate thermodynamic properties through a loop that comprises a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops. Various technologies have been proposed such as field-active heat or electric current-responsive heat transfer systems relying on materials such as electrocaloric materials, magnetocaloric materials, or thermoelectric materials. However, many proposals have been configured as bench-scale demonstrations with limited practical applications.

BRIEF DESCRIPTION

According to some embodiments of this disclosure, an electrocaloric heat transfer system comprises first and second electrocaloric modules. The first electrocaloric module comprises a first electrocaloric element disposed between electrodes, a first port, a second port, and a first fluid flow path between the first port and the second port in thermal communication with the first electrocaloric element. The second electrocaloric module comprises a second electrocaloric element disposed between electrodes, a third port, a fourth port, and a second fluid flow path between the third port and the fourth port in thermal communication with the second electrocaloric element. The system also includes an inlet in fluid communication with and configured to receive fluid from a heat source or heat sink, and in controllable fluid communication with and configured to direct the fluid to the first port or the fourth port. An outlet is disposed in controllable fluid communication with and configured to receive fluid from the first port or the fourth port, and in fluid communication with and configured to discharge the fluid to the heat source or heat sink. A third fluid flow path is disposed between the second port and the third port. The third fluid flow path comprises a fluid mixer comprising fluid inlets in controllable communication with the second port, the third port, and a conditioned fluid space, and a fluid separator comprising a fluid inlet that receives mixed fluid from the fluid mixer, a fluid outlet in communication with the second or third port, and a fluid outlet in communication with the conditioned fluid space.

In any one or combination of the foregoing embodiments, in an operational state the fluid inlet is in communication with and receives fluid from a heat sink, and the third fluid flow path absorbs heat from the conditioned space.

In any one or combination of the foregoing embodiments, in an operational state the fluid inlet is in communication with and receives fluid from a heat source, and the third fluid flow path rejects heat to the conditioned space.

In any one or combination of the foregoing embodiments, in an operational state each of the first and second electrocaloric modules has a thermal gradient along each of the first and second flow paths, respectively.

In any one or combination of the foregoing embodiments, in an operational state the first electrocaloric module includes a hot side proximate to the first port and a cold side proximate to the second port, and the second electrocaloric module includes a hot side proximate to the fourth port and a cold side proximate to the third port.

In any one or combination of the foregoing embodiments, the fluid mixer inlet in communication with the conditioned space is configured to provide a mass flow rate of fluid at a conditioned space return temperature, and the fluid inlet in communication with the heat source or heat sink and the first and second electrocaloric modules are configured to provide a mass flow rate of fluid at an outlet temperature of the third or fourth port, such that the mixed fluid on the third fluid flow path is at a target temperature.

In any one or combination of the foregoing embodiments, the system further comprises a controller configured to alternately energize and de-energize the electrodes of the first and second electrocaloric modules while providing cycled back and forth fluid flow along the first and second fluid flow paths by alternately directing fluid from the fluid inlet to the first port to the second port to the third port to the fourth port to the fluid outlet, or from the fluid inlet to the fourth port to the third port to the second port to the first port to the fluid outlet.

In any one or combination of the foregoing embodiments, the electrodes of the first electrocaloric module are energized when the fluid is directed from the inlet to the fourth port, and the electrodes of the second electrocaloric module are energized when the fluid is directed from the inlet to the first port.

In any one or combination of the foregoing embodiments, the controller is configured to provide the cycled back and forth fluid flow along the first and second flow paths such that each back or forth fluid flow cycle displaces a volume of fluid smaller than the volume of either the first or second flow paths.

In any one or combination of the foregoing embodiments, the fluid comprises a gas.

In any one or combination of the foregoing embodiments, the fluid comprises air.

In any one or combination of the foregoing embodiments, the system further comprises a re-directable airflow path from a heat source or heat sink airflow source to the first or fourth port.

In any one or combination of the foregoing embodiments, the system further comprises a re-directable airflow path to the second or third port from the fluid separator outlet in communication with the second or third port.

In any one or combination of the foregoing embodiments, the system further comprises one or more additional electrocaloric modules individually comprising a pair of ports in controllable fluid communication with either the third fluid flow path or the fluid inlet and fluid outlet.

In any one or combination of the foregoing embodiments, the first, second, and additional electrocaloric modules are configured as a cascade, and the system further comprises fluid flow shut-offs between each electrocaloric module in the cascade.

In any one or combination of the foregoing embodiments, the one or more additional caloric modules are each configured with a flow path between the pair of ports that is parallel to the first or second flow paths.

In some embodiments, an electrocaloric heat transfer system comprises a first electrocaloric module comprising a first electrocaloric element disposed between electrodes, a first port, a second port, and a first fluid flow path between the first port and the second port in thermal communication with the first electrocaloric element. A fluid innet is configured to receive fluid from a heat source or heat sink, and to controllably direct the fluid to the first port. A fluid outlet is configured to controllably receive fluid from the first port, and to discharge the fluid to the heat source or heat sink. A third fluid flow path comprises a fluid mixer comprising fluid inlets in controllable communication with the second port and with a conditioned fluid space, and a fluid separator comprising a fluid inlet that receives mixed fluid from the fluid mixer, a fluid outlet in communication with the second port, and a fluid outlet in communication with the conditioned fluid space. In some embodiments, the system further comprises a controller configured to alternately energize and de-energize the electrodes of the first and second electrocaloric modules while providing cycled back and forth fluid flow along the first and second fluid flow paths by alternately directing fluid from the fluid inlet to the first port to the second port to the fluid mixer, or from the fluid separator to the second port to the first port to the fluid outlet. In some embodiments, the controller is further configured to: (i) the electrodes of the first electrocaloric module are energized when fluid is directed from the separator to the second port, and the electrodes of the first electrocaloric module are not energized when the fluid is directed from the inlet to the first port, or (ii) provide the cycled back and forth fluid flow along the first flow path such that each back or forth fluid flow cycle displaces a volume of fluid smaller than the volume of the first path; or (iii) both (i) and (ii).

In some embodiments, a method of transferring heat comprises (a) directing a heat transfer fluid to a first electrocaloric module and from the first electrocaloric module to a heat exchanger to a second electrocaloric module while energizing one of the first and second electrocaloric modules;

(b) directing the heat transfer fluid to the second electrocaloric module to the heat exchanger to the first electrocaloric module while energizing the other of the first and second electrocaloric modules;

(c) repeating (a) and (b) in alternating order to cause a temperature gradient in each of the first and second electrocaloric modules; and (d) mixing outlet fluid flow from the third or fourth port with fluid from a conditioned space, directing a portion of the mixed fluid flow to the conditioned space, and receiving a portion of the mixed fluid flow as inlet flow at the third or fourth port, and rejecting heat to the fluid from the heat exchanger or absorbing heat from the fluid by the heat exchanger.

In any one or combination of the foregoing method embodiments, the second electrocaloric module is energized in (a) and the first electrocaloric module is energized in (b), and heat is absorbed from the conditioned space.

In any one or combination of the foregoing method embodiments, the first electrocaloric module is energized in (a) and the second electrocaloric module is energized in (b), and heat is transferred to the conditioned space.

In any one or combination of the foregoing method embodiments, an amount of fluid of smaller volume than the fluid volume of either the first and second electrocaloric modules is introduced during each of (a) and (b).

In any one or combination of the foregoing method embodiments, the relative relative mass flow rates of the third fluid flow path compared to the conditioned space fluid flow rates are controlled.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
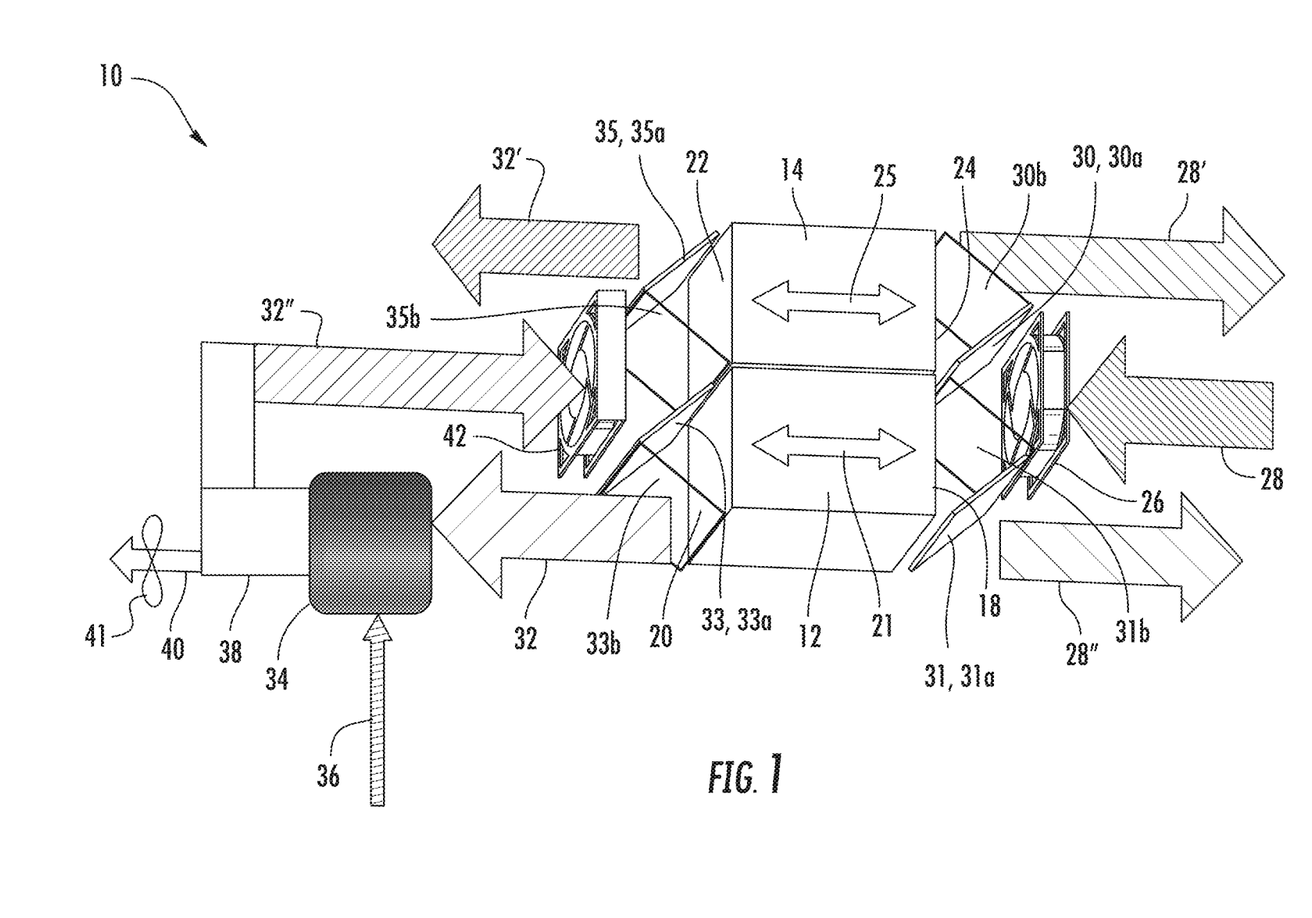
FIG. 1 is a schematic depiction of an example embodiment of a heat transfer system.

With reference now to the Figures, FIG. 1 schematically depicts an example embodiment of a heat transfer system 10. As shown in FIG. 1, the heat transfer system 10 comprises a first electrocaloric module 12 and a second electrocaloric module 14. Each of the first and second electrocaloric modules 12, 14 includes a stack of electrocaloric elements (not shown), e.g., electrocaloric films disposed between electrodes disposed between electrodes. Examples of electrocaloric materials for the electrocaloric film can include but are not limited to inorganic materials (e.g., ceramics), electrocaloric polymers, and polymer/ceramic composites. Examples of inorganics include but are not limited to $PbTiO_3$ ("PT"), $Pb(Mg_{1/3}Nb_{2/3})O_3$ ("PMN"), PMN-PT, $LiTaO_3$, barium strontium titanate (BST) or PZT (lead, zirconium, titanium, oxygen). Examples of electrocaloric polymers include, but are not limited to ferroelectric polymers (e.g., Polyvinylidene fluoride and copolymers containing repeat units derived from vinylidene fluoride and other halogenated or non-halogenated addition polymerizable comonomers), liquid crystal polymers, and liquid crystal elastomers.

With continued reference to FIG. 1, the first electrocaloric module 12 includes a first port 18 and a plurality of second ports 20, with a first fluid flow path 21 between the first and second ports and in thermal communication with the electrocaloric modules 12 of the first electrocaloric module 12. The second electrocaloric module 14 includes a plurality of third ports 22 and a fourth port 24, with a second fluid flow path 25 between the third and fourth ports and in thermal communication with the electrocaloric modules 12 of the second electrocaloric module 14. An inlet 26 receives a fluid 28 from a heat source or heat sink (not shown). Examples of fluids for working fluid 28 include but are not limited to air (including modified air such as oxygen-enriched air (OEA), nitrogen-enriched air (NEA)), other gases (e.g., virtually any industrial process gas), polar or non-polar organic liquids (including dielectric or conductive organic liquids), fuels, electroactive fluids, water, and many other specific examples. Electrically-conductive fluids, including but not limited to inherently conductive fluid compounds or fluids comprising an electrolyte that promotes conductivity (e.g., water comprising a dissolved salt), can utilize appropriate device design configuration to avoid short circuits through the fluid. Example embodiments of a device design to avoid such short circuits is to embed the electrodes within an electrocaloric film or between adjacent electric films to isolate the electrode from the electrically conductive fluid, as disclosed in patent application PCT/US2015/67185, the disclosure of which is incorporated herein by reference in its entirety. Example embodiments of a electrocaloric devices and systems utilizing electroactive liquids are disclosed in patent application PCT/US2014/068497, the disclosure of which is incorporated herein by reference in its entirety. Air inlet 26 can also include a fan to promote flow of the fluid 28 from the heat source or heat sink to the electrocaloric modules. The heat source or heat sink can be a source of fluid at a suitable heat sink/source temperature and having a relatively large thermal mass (e.g., outside ambient air or a large mass of liquid at a suitable temperature), or can be a heat exchanger in thermal communication with a thermal target, such that the heat transfer system sees it as a heat sink or heat source. The fluid 28 is controllably directed by flapper doors 30 and 31 from the inlet 26 to the first electrocaloric module 12 through the first port 18 or to the second electrocaloric module 14 through the fourth port 24. Flapper doors 30 and 31 can be set in the position designated as 30a and 31a to direct fluid 28 from the inlet 26 to the first electrocaloric module 12, or they can be set in the position designated as 30b, 31b to direct fluid 28 from the inlet 26 to the second electrocaloric module 14.

Fluid entering through the inlet 26 displaces fluid in the first or second module 12, 14 onto a third fluid flow path 32 between the third and fourth ports 22 and 24. As will be discussed further below, flow can be in either direction on the first and second fluid flow paths 21 and 25 (as indicated by the bi-directional arrows), depending on the position of the flapper doors. Fluid displaced from the third fluid flow path 32 is directed into the other of the first or second electrocaloric modules 12, 14 (the module not receiving fluid from the inlet 26) by flapper doors 33 and 35, from where it exits as working fluid discharge 28' through the first or second port 18, 20 and flows to the heat source or heat sink. Flapper doors 33 and 35 can be set in the position designated as 33a and 35a to direct fluid from port 20 to the fluid mixer 34, or they can be set in the position designated as 33b, 35b to direct fluid from the port 22 to the second fluid mixer 34 along an alternate route 32' for the third fluid flow path. Third fluid flow path alternate route 32' flows into the fluid mixer 34; however that flow path connection is omitted in the Figures for ease of illustration.

Fluid on the third fluid flow path 32 flows to fluid mixer 34 having inlets in fluid communication with the third fluid flow path 32 and return fluid flow 36 from a conditioned fluid space (not shown). The mixed fluid from the fluid mixer 34 is separated by fluid separator 38, which directs a portion of the fluid back to the conditioned space as conditioned fluid 40 (assisted by fan 41) and directs a portion along a continuation of fluid flow path 32 (designated as 32"). Although schematically depicted as separate components, the fluid mixer 34 and the separator 36 can be integrated into a single unit or device. The fluid continuing along the portion of the third fluid flow path 32", assisted by fan 42 is directed by the flapper doors 33, 35 to either of the ports 20 or 18, with flow directed to port 22 with the flapper doors in position 33a, 35a, or to port 20 with the doors in position 33b, 35b.

In operation, the system operates the first and second electrocaloric modules 12, 14 out of sync in an internal heat regenerative mode, as described in more detail below. In this mode, one of the electrocaloric modules operates in a regeneration mode absorbing heat from the working fluid with the electrodes de-energized, while the other electrocaloric module operates in an active mode transferring heat to the working fluid with the electrodes energized. The system is operated such that each of the electrocaloric modules alternately shifts between regeneration mode and active mode, with synchronization of the fluid flow. Fluid flow is synchronized with the operational states to provide a back and forth flow pattern along the first, second, and third fluid flow paths so that each of the first and second modules provides a regeneration-enhanced temperature lift.

A non-limiting example embodiment of the operation of the system in a cooling mode is described below with respect to FIGS. 2A and 2B. Example fluid temperatures suitable for an HVAC heat transfer application (e.g., residential or commercial cooling) at ambient temperate conditions are referenced below to assist in understanding of the operation of the system, however, it should be understood that these temperatures are used for illustrative purposes only and other temperatures can be utilized depending on system design parameters and target application. Reference numerals from FIG. 1 are carried forward into FIGS. 2A and 2B and have the same meaning as in FIG. 1, so their description is not repeated below.

Figure 2A:
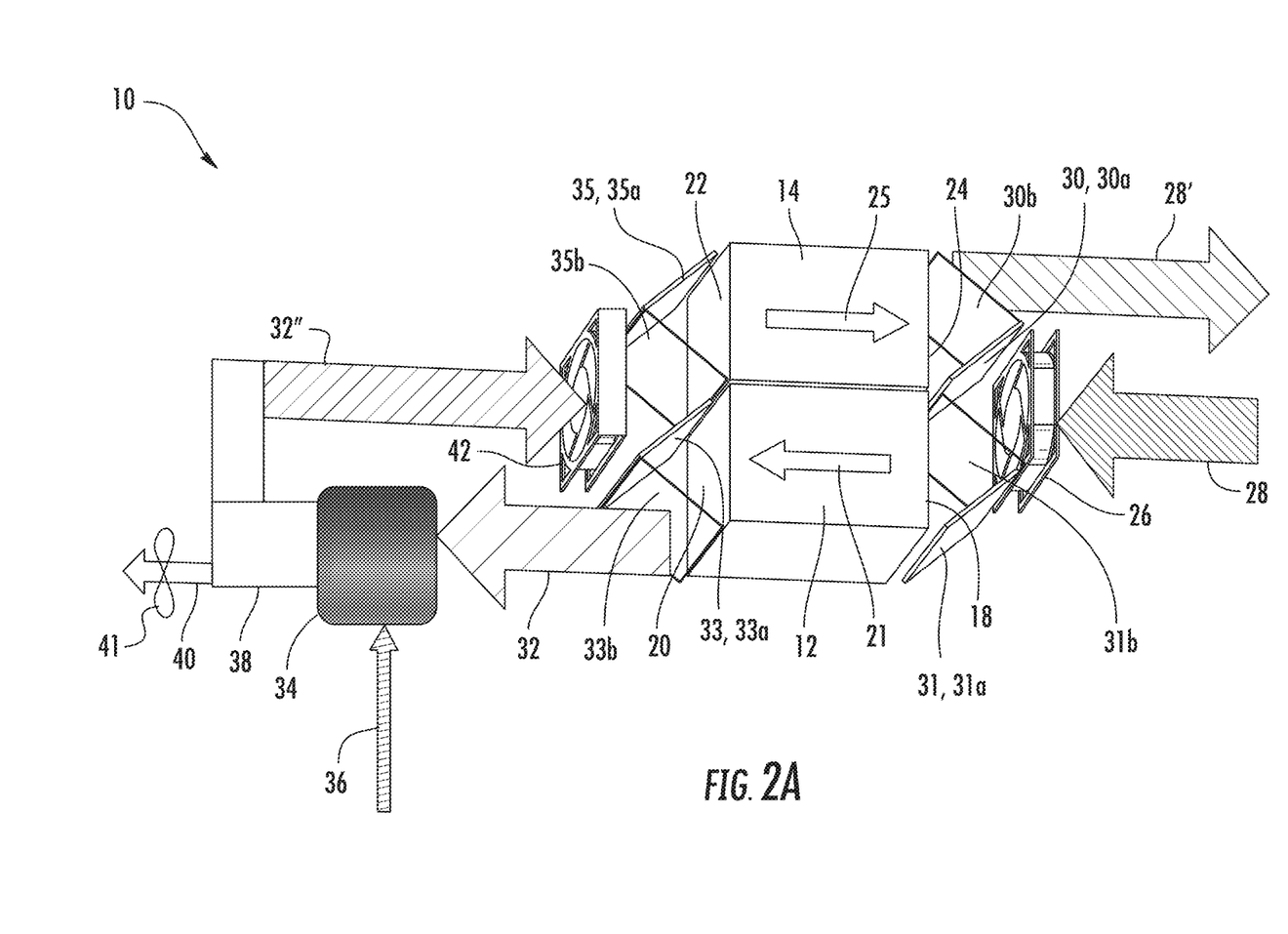
FIG. 2A is a schematic depiction of an example embodiment of a heat transfer system in a first mode of operation.

As shown in FIG. 2A, the system can operate in a first mode where fluid 28 (e.g., outside air) enters the inlet from a heat sink. The air is directed by the flapper doors 30, 31 in positions 30a, 31a to port 18 of the first electrocaloric module 12 which is in regenerative mode with the electrodes de-energized. As an illustrative example, the temperature of the outside air can be at about 82° F. and can flow at a relative mass flow rate of 4 ṁ. In regenerative mode with the electrodes de-energized, the electrocaloric material experiences an increase in entropy compared to a prior active mode state, and a concomitant drop in temperature (assuming adiabatic conditions). Heat is transferred from the relatively warm air along the first fluid flow path 21 to the relatively cold electrocaloric elements, resulting in a drop in temperature of the air from about 82° F. at the port 18 to about 55° F. at the port 20. The air is directed from the port 20 by the doors 33, 35 in the 33a, 35a position along the third fluid flow path 32 to fluid mixer 34, where it is mixed with conditioned space return flow 36 (in this example, at 80° F. and a mass flow rate of 1 ṁ), resulting in a mixed air flow exiting the fluid mixer 34 at about 60° F. and 5 ṁ flow rate.

1 ṁ of this flow 60° F. air is returned by the separator 36 to the conditioned space as conditioned air, and 4 ṁ of the flow of 60° F. air is directed to the fan 42, where doors 33, 35 in the 33a, 35a position direct the air to port 22 where it enters the second electrocaloric module 14. In this first operational mode, the second electrocaloric module 14 is in active mode with the electrodes energized. In active mode with the electrodes energized, the electrocaloric material experiences a decrease in entropy compared to a prior regenerative mode state, and a concomitant increase in temperature (assuming adiabatic conditions). Heat is transferred from the relatively warm electrocaloric elements to the relatively cold air along the second fluid flow path 25, resulting in an increase in temperature of the air from about 60° F. at the port 22 to about 88° F. at the port 24. This removal of heat from the electrocaloric elements prepares the electrocaloric elements for the next regenerative cycle where removal of the electric field results in a temperature drop (assuming adiabatic conditions) for the electrocaloric material.

Figure 2B:
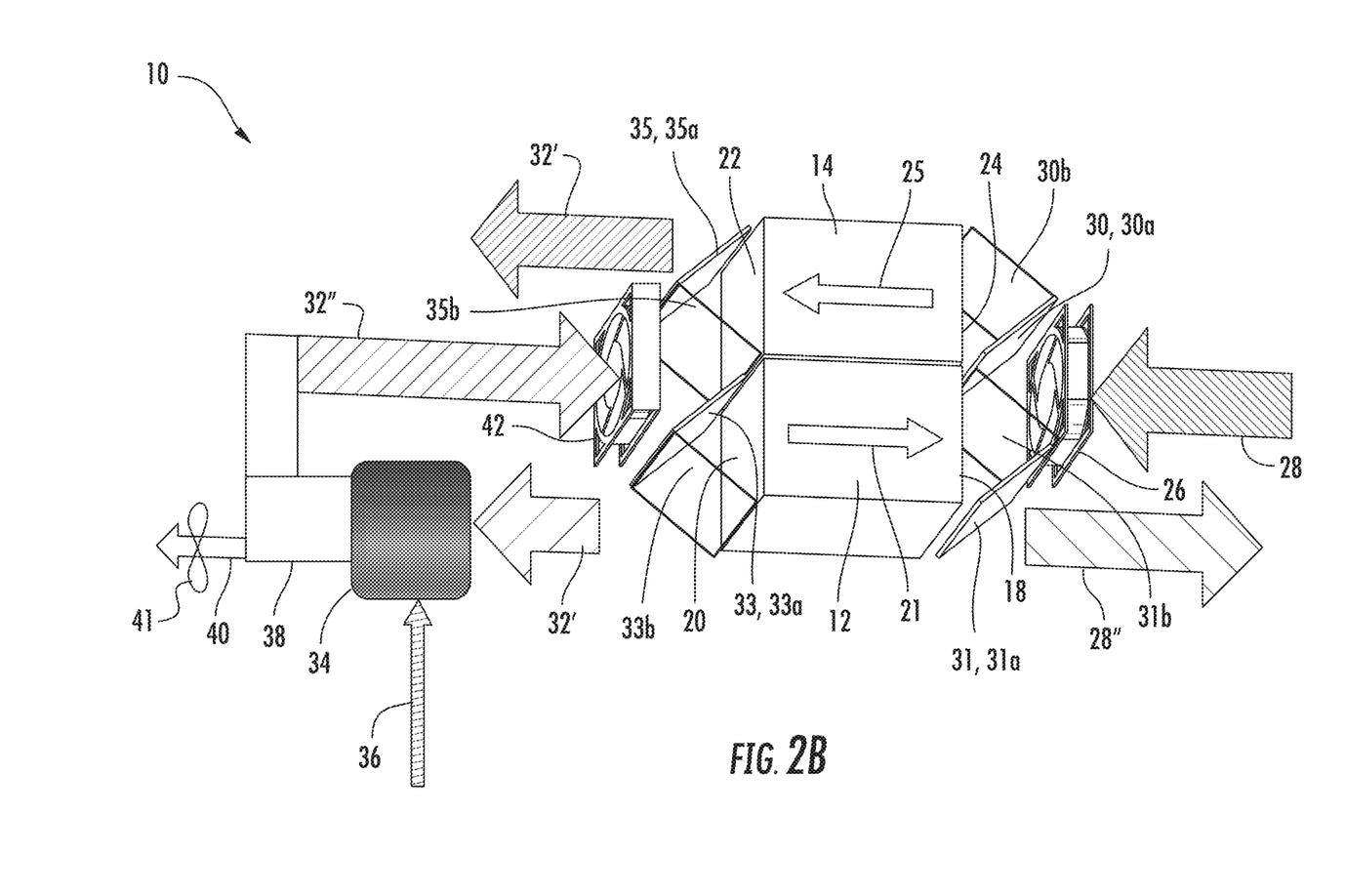
FIG. 2B is a schematic depiction of the example embodiment of a heat transfer system in a second mode of operation.

As shown in FIG. 2B, the system can operate in a second mode where outside air is directed by the flapper doors 30, 31 in positions 30b, 31b to port 24 of the second electrocaloric module 14 which is in regenerative mode with the electrodes de-energized. As an illustrative example, the temperature of the outside air can be at about 82° F. and can flow at a relative mass flow rate of 4 ṁ. In regenerative mode with the electrodes de-energized, the electrocaloric material experiences an increase in entropy compared to a prior active mode state, and a concomitant drop in temperature (assuming adiabatic conditions). Heat is transferred from the relatively warm air along the second fluid flow path 25 to the relatively cold electrocaloric elements, resulting in a drop in temperature of the air from about 82° F. at the port 24 to about 55° F. at the port 22. The air is directed from the port 22 by the doors 33, 35 in the 33b, 35b position along the fluid flow path alternate route 32' to fluid mixer 34 (connection not shown), where it is mixed with conditioned space return flow 36 (in this example, at 80° F. and a mass flow rate of 1 ṁ), resulting in a mixed air flow exiting the fluid mixer 34 at about 60° F. and 5 ṁ flow rate. 1 ṁ of this flow 60° F. air is returned by the separator 38 to the conditioned space as conditioned air, and 4 ṁ of the flow of 60° F. air is directed to the fan 42, where doors 33, 35 in the 33b, 35b position direct the air to port 20 where it enters the first electrocaloric module 12. In this second operational mode, the first electrocaloric module 12 is in active mode with the electrodes energized. In active mode with the electrodes energized, the electrocaloric material experiences a decrease in entropy compared to a prior regenerative mode state, and a concomitant increase in temperature (assuming adiabatic conditions). Heat is transferred from the relatively warm electrocaloric elements to the relatively cold air along the first fluid flow path 21, resulting in an increase in temperature of the air from about 60° F. at the port 20 to about 88° F. at the port 18. This removal of heat from the electrocaloric elements prepares the electrocaloric elements for the next regenerative cycle where removal of the electric field results in a temperature drop (assuming adiabatic conditions) for the electrocaloric material.

Figure 3:
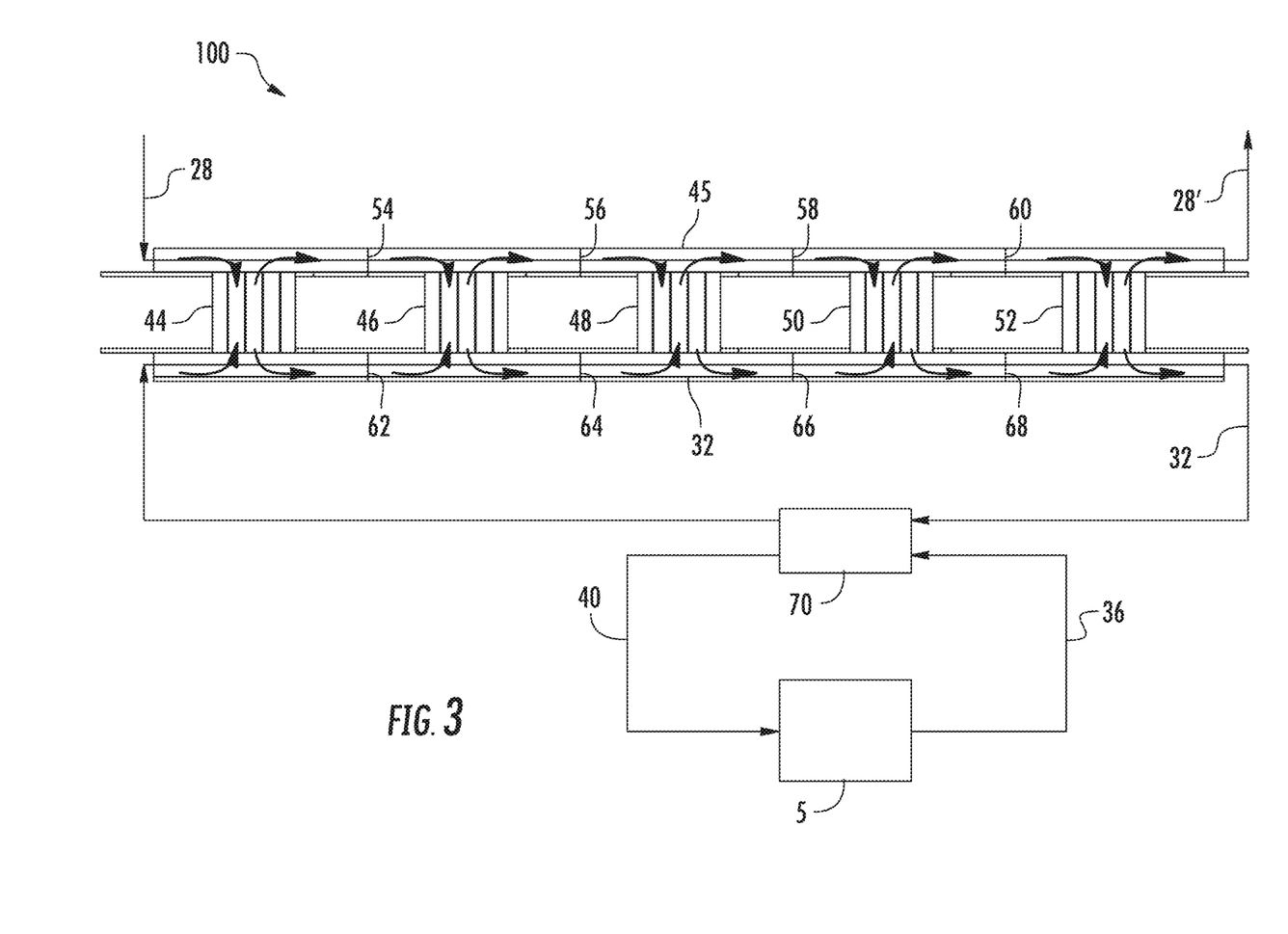
FIG. 3 is a schematic depiction of an example embodiment of a heat transfer system comprising a cascade of electrocaloric modules.

As mentioned above, the embodiments depicted in FIGS. 1-4 are example embodiments, and other configurations can be utilized. For example, each of the FIGS. 1-3 depicts two electrocaloric modules 12 and 14, and FIGS. 4A and 4B as discussed below depict a cascaded of electrocaloric modules. however, alternative configurations to FIGS. 1-3 can utilize multiple electrocaloric modules in parallel with either or both of the first and second elements 12 and 14, in common fluid communication with the inlet, outlet, heat sink/source, and third fluid flow path through flow collection and distribution structures (not shown) such as manifolds, headers or plenums. Also, multiple systems can also be networked together. For example, a plurality of systems 10 could be disposed at varying locations along a building-wide air ventilation circulation loop, all in communication with the same thermal target. The networked systems, each with its own third fluid flow path that intermixes and is separated from the wider circulation loop, could have separate working fluid flow paths to and from the heat sink/source or they could share a common flow path in parallel through flow control devices (e.g., manifolds, headers, plenums) as described above.

The system 10 can be operated in either cooling mode as described above, or in a heating or heat pump mode. In both modes, the electrocaloric modules are alternately cycled out of sync between an active mode where the electrodes are energized and a regeneration mode where the electrodes are de-energized. In the cooling mode, the first electrocaloric module 12 has a hot side proximate to port 18 and a cold side proximate to ports 20, and the second electrocaloric module 14 has a hot side proximate to port 24 and a cold side proximate to ports 22. In the cooling mode, the fluid 28 is directed from a heat sink to the electrocaloric module in regeneration mode, with flow proceeding from the regenerating electrocaloric module to the third fluid flow path 32 where it is mixed with return fluid from a conditioned space to provide cooled conditioned supply air for the conditioned space. In the heat pump mode, the first electrocaloric module 12 has a cold side proximate to port 18 and a hot side proximate to ports 20, and the second electrocaloric module 14 has a cold side proximate to port 24 and a hot side proximate to ports 22. In the heat pump mode, the fluid 28 is directed from a heat source to the electrocaloric module in active mode, with flow proceeding from the active electrocaloric module to the third fluid flow path 32 where it is mixed with return fluid from a conditioned space to provide heated conditioned supply air for the conditioned space.

In some embodiments, the electrocaloric modules 12, 14 are operated in an internal regenerative mode. In an internal regenerative mode, only a portion of the total volume of working fluid in each of the respective first and second flow paths 21, 25 is displaced during each cycle of the alternating cycles of activation and regeneration. This allows heat from the activation cycles retained by fluid internal to the first or second flow path that was not displaced during the active cycle to provide heat to the electrocaloric material during the regenerative cycle. With repetition of cycles where each electrocaloric module experiences a back and forth partial displacement of fluid for each active/regenerative cycle, such internal regeneration can provide a significant temperature gradient (i.e., temperature lift) across the electrocaloric modules between 18 and 20, and between ports 24 and 22. In some embodiments, the system can be configured to provide a target temperature at the ports 22, 24, in order to provide a target temperature to meet the thermal load of the conditioned space on the third fluid flow path. System control to achieve a target temperature at the ports 22, 24 and/or a target temperature for the conditioned air 40 can be implemented in various ways. For example, in some embodiments, target temperatures and/or target levels of heat transfer can be achieved by controlling the relative mass flow rates of the third fluid flow path compared to the fluid flow rates for return flow 36 and conditioned fluid flow 40 through the mixer 34 and separator 38.

Figure 4A:
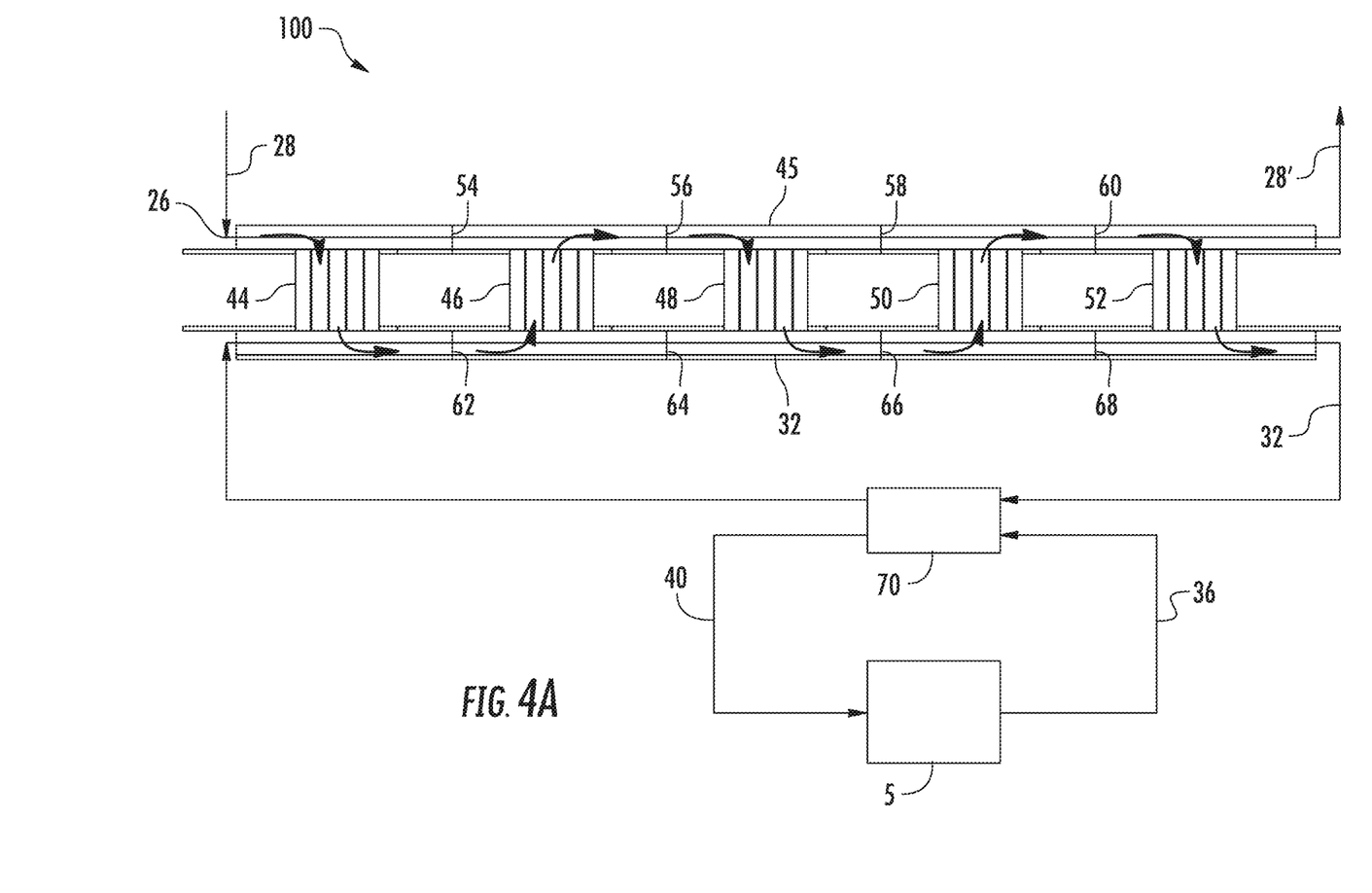
FIGS. 4A and 4B depict of the cascade in first and second modes of operation, respectively.
Figure 4B:
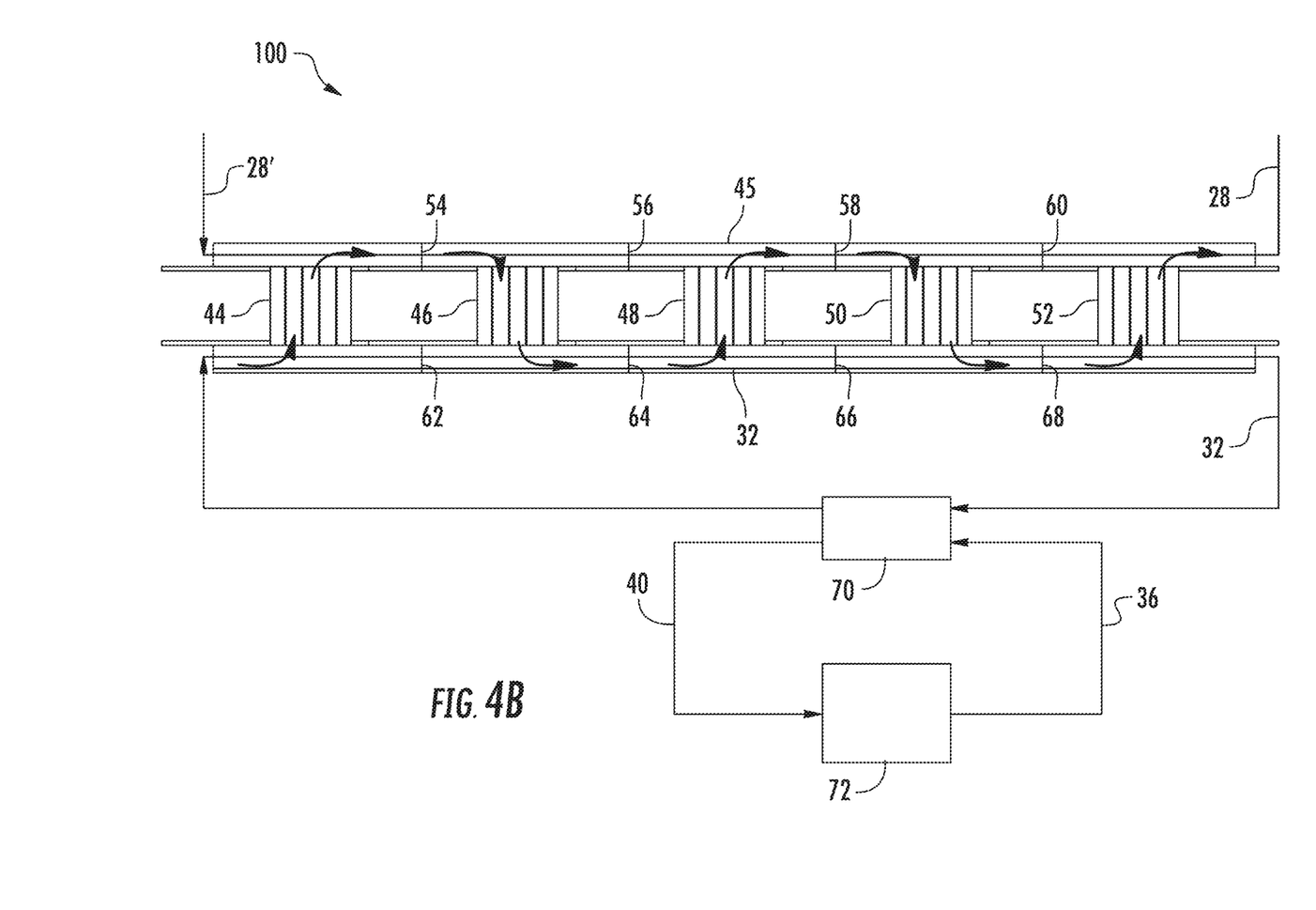

In some embodiments, the heat transfer system can include one or more additional electrocaloric modules in a cascaded configuration. An example embodiment of a cascaded heat transfer system 100 is schematically depicted in FIGS. 3, 4A, and 4B. As shown in FIGS. 3, 4A, and, and 4B, cascaded electrocaloric modules 44, 46, 48, and 52 share a common third fluid flow path 32, and a common flow path 45 for heat sink/source fluid (e.g., outside air). Fluid flow shut-offs 54, 56, 58, and 60 are disposed along the flow path 45 between the electrocaloric modules, and fluid flow shut-offs 62, 64, 66, and 68 are disposed along the common third fluid flow path 32 between the electrocaloric modules. As will be appreciated from an understanding of the operation of this system (described below), any two adjacent electrocaloric modules can be characterized and related to one another with first and fourth ports in controllable communication with the common flow path 45 for heat sink/source fluid flow and second and third ports in controllable communication with the common third fluid flow path 32. Other features numbered the same as in FIGS. 1, 2A, and 2B are the same as described with respect to those figures, which description is not repeated hereinbelow.

During operation, as shown in FIG. 4A, the system can operate in a first mode where fluid 28 (e.g., outside air) enters the inlet from a heat sink. In the first mode of operation, fluid flow shut-offs 54, 58, 64, and 68 are closed, and fluid flow shut-offs 56, 60, 62, and 66 are open. For cooling, in this first mode of operation, electrocaloric modules 44, 48, and 52 are in regenerative mode with the electrodes de-energized. As an illustrative example, the temperature of the outside air can be at about 82° F. and can flow at a relative mass flow rate of 4 ṁ. In regenerative mode with the electrodes de-energized, the electrocaloric material experiences an increase in entropy compared to a prior active mode state, and a concomitant drop in temperature (assuming adiabatic conditions). Heat is transferred from the relatively warm air to the relatively cold electrocaloric elements, resulting in a drop in temperature of the air at the inflowing port of each regenerating electrocaloric module to the air at the outflowing port of each regenerating electrocaloric module. Meanwhile, in this mode of operation, air is directed from the relatively cool common third fluid flow path 32 to the activated electrocaloric modules 46 and 50 to prepare them for the next regenerative cycle.

As shown in FIG. 4B, the system can operate in a second mode where fluid flow shut-offs 56, 60, 62, and 66 are closed, fluid flow shut-offs 54, 58, 64, and 68 are open, electrocaloric modules 46 and 50 are in regenerative mode with the electrodes de-energized, and electrocaloric modules 44, 48, and 52 are activated with the electrodes energized. As can be seen by a comparison of FIGS. 4A and 4B, each electricaloric module undergoes internal regeneration with a back and forth fluid flow between a hot side and a cold side while continuous fluid flow is maintained along the flow paths 32 and 45 to allow for efficient operation of fluid prime movers such as fans. The cascaded configuration of the electrocaloric module can allows for additive temperature lifts among the electrocaloric modules to be achieved.

The air is directed along the third fluid flow path 32 to fluid mixer/separator 70 where it is mixed with conditioned space return flow 36 from conditioned space 72 (in this example, at 80° F. and a mass flow rate of 1 ṁ), resulting in a mixed air flow exiting the fluid mixer/separator 70 at about 60° F. and 5 ṁ flow rate. 1 ṁ of this flow 60° F. air is returned by the separator 36 to the conditioned space 72 as conditioned air 40, and 4 ṁ of the flow of 60° F. air is directed back to the electrocaloric modules.

Figure 5:
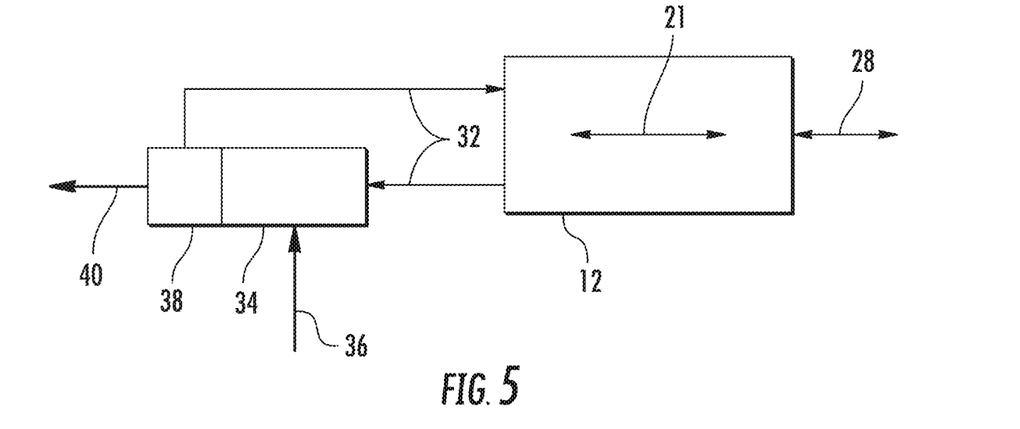
FIG. 5 is a schematic depiction of an example embodiment of a heat transfer system.

Alternatively to the systems described above, in some embodiments, a system can include a single electrocaloric module as schematically depicted in FIG. 5. The numbering of components and their function is repeated from FIG. 1, the specifics of which do not necessitate repetition and can be referenced from the description of FIG. 1 above. The system of FIG. 5 provides alternating back and forth flow of the fluid 28 between the electrocaloric module 12 and the heat source or heat sink (not shown), which is treated in the electrocaloric module 12 and mixed with and separated from fluid from the thermal target in mixer 34 and separator 38. The fluid on fluid flow path 32 is then returned to the electrocaloric module 12 flowing in the opposite direction toward the heat source or heat sink. Timing and sequencing of the bi-directional fluid flow along the flow path can be accomplished by timing and sequencing of the inlet and outlet flows of the mixer and separator 34, 38.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electrocaloric heat transfer system, comprising:
a first electrocaloric module comprising a first electrocaloric element disposed between electrodes, a first port, a second port, and a first fluid flow path between the first port and the second port in thermal communication with the first electrocaloric element;
a second electrocaloric module comprising a second electrocaloric element disposed between electrodes, a third port, a fourth port, and a second fluid flow path between the third port and the fourth port in thermal communication with the second electrocaloric element;
a fluid inlet configured to receive fluid from a heat source or heat sink, and to controllably direct the fluid to the first port or the fourth port;
a fluid outlet configured to controllably receive fluid from the first port or the fourth port, and to discharge the fluid to the heat source or heat sink;
a third fluid flow path between the second port and the third port, the third fluid flow path comprising a fluid mixer comprising mixer fluid inlets in controllable communication with the second port, the third port, and a conditioned fluid space, and a fluid separator comprising a separator fluid inlet that receives mixed fluid from the fluid mixer, a separator first fluid outlet in communication with the second or third port, and a separator second fluid outlet in communication with the conditioned fluid space.

2. The system of claim 1, in an operational state wherein the fluid inlet is in communication with and receives fluid from the heat sink, and the third fluid flow path absorbs heat from the conditioned space.

3. The system of claim 1, in an operational state wherein the fluid inlet is in communication with and receives fluid from the heat source, and the third fluid flow path rejects heat to the conditioned space.

4. The system of claim 1, wherein in an operational state, each of the first and second electrocaloric modules has a thermal gradient along each of the first and second flow paths, respectively.

5. The system of claim 4, wherein in an operational state the first electrocaloric module includes a hot side proximate to the first port and a cold side proximate to the second port, and the second electrocaloric module includes a hot side proximate to the fourth port and a cold side proximate to the third port.

6. The system of claim 5, wherein the fluid mixer inlet in communication with the conditioned space is configured to provide a mass flow rate of fluid at a return temperature of the conditioned space, and the fluid inlet in communication with the heat source or heat sink and the first and second electrocaloric modules are configured to provide a mass flow rate of fluid at an outlet temperature of the third or fourth port, such that the mixed fluid on the third fluid flow path is at a target temperature.

7. The system of claim 1, further comprising a controller configured to alternately energize and de-energize the electrodes of the first and second electrocaloric modules while providing cycled back and forth fluid flow along the first and second fluid flow paths by alternately directing fluid from the fluid inlet to the first port to the second port to the third port to the fourth port to the fluid outlet, or from the fluid inlet to the fourth port to the third port to the second port to the first port to the fluid outlet.

8. The system of claim 7, wherein the electrodes of the first electrocaloric module are energized when the fluid is directed from the inlet to the fourth port, and the electrodes of the second electrocaloric module are energized when the fluid is directed from the inlet to the first port.

9. The system of claim 7, wherein the controller is configured to provide the cycled back and forth fluid flow along the first and second flow paths such that each back or forth fluid flow cycle displaces a volume of fluid smaller than the volume of either the first or second flow paths.

10. The system of claim 1, further comprising a re-directable fluid flow path from an airflow source from the heat source or heat sink to the first or fourth port.

11. The system of claim 10, further comprising a re-directable airflow path to the second or third port from the fluid separator outlet in communication with the second or third port.

12. The system of claim 1, further comprising one or more additional electrocaloric modules individually comprising a pair of ports in controllable fluid communication with either the third fluid flow path or the fluid inlet and fluid outlet.

13. The system of claim 12, wherein the first, second, and additional electrocaloric modules are configured as a cascade, and further comprising fluid flow shut-offs between each electrocaloric module in the cascade.

14. The system of claim 13, wherein the one or more additional caloric modules are each configured with a flow path between the pair of ports that is parallel to the first or second flow paths.

15. An electrocaloric heat transfer system, comprising:
a first electrocaloric module comprising a first electrocaloric element disposed between electrodes, a first port, a second port, and a first fluid flow path between the first port and the second port in thermal communication with the first electrocaloric element;
a fluid inlet configured to receive fluid from a heat source or heat sink, and to controllably direct the fluid to the first port;
a fluid outlet configured to controllably receive fluid from the first port, and to discharge the fluid to the heat source or heat sink;
a third fluid flow path comprising a fluid mixer comprising mixer fluid inlets in controllable communication with the second port and with a conditioned fluid space, and a fluid separator comprising a separator fluid inlet that receives mixed fluid from the fluid mixer, a separator first fluid outlet in communication with the second port, and a separator second fluid outlet in communication with the conditioned fluid space.

16. The system of claim 15, further comprising a controller configured to alternately energize and de-energize the electrodes of the first and second electrocaloric modules while providing cycled back and forth fluid flow along the first and second fluid flow paths by alternately directing fluid from the fluid inlet to the first port to the second port to the fluid mixer, or from the fluid separator to the second port to the first port to the fluid outlet.

17. The system of claim 16, wherein the controller is further configured to: (i) the electrodes of the first electrocaloric module are energized when fluid is directed from the separator to the second port, and the electrodes of the first electrocaloric module are not energized when the fluid is directed from the fluid inlet to the first port, or (ii) provide the cycled back and forth fluid flow along the first flow path such that each back or forth fluid flow cycle displaces a volume of fluid smaller than the volume of the first path; or (iii) both (i) and (ii).

* * * * *